United States Patent
Boni et al.

(10) Patent No.: US 8,903,789 B2
(45) Date of Patent: Dec. 2, 2014

(54) DERIVED PRESENCE-AWARE SERVICE FROM ASSOCIATED ENTITIES

(75) Inventors: Piotr Boni, Providence, RI (US); Boris S. Elman, Newton, MA (US); David G. Kenneson, Acton, MA (US); Henning Schulzrinne, Leonia, NJ (US); Vishal K. Singh, New York, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1239 days.

(21) Appl. No.: 11/622,206

(22) Filed: Jan. 11, 2007

(65) Prior Publication Data

US 2008/0016100 A1 Jan. 17, 2008

Related U.S. Application Data

(60) Provisional application No. 60/807,127, filed on Jul. 12, 2006.

(51) Int. Cl.
*G06F 17/00* (2006.01)
*H04W 24/00* (2009.01)
*H04W 4/02* (2009.01)
*H04L 29/08* (2006.01)

(52) U.S. Cl.
CPC ............... *H04L 67/24* (2013.01); *H04L 67/18* (2013.01); *H04L 67/12* (2013.01); *H04W 4/02* (2013.01)
USPC ........ 707/702; 709/224; 709/238; 455/435.1; 455/456.1

(58) Field of Classification Search
CPC ......... H04L 67/12; H04L 67/18; H04L 67/24; H04W 4/02

USPC ............... 707/702; 709/224, 238; 455/435.1, 455/456.1

See application file for complete search history.

(56) References Cited

U.S. PATENT DOCUMENTS

| | | | |
|---|---|---|---|
| 5,515,026 A * | 5/1996 | Ewert | 340/436 |
| 6,571,285 B1 * | 5/2003 | Groath et al. | 709/223 |
| 6,658,095 B1 * | 12/2003 | Yoakum et al. | 379/93.01 |
| 6,957,133 B1 * | 10/2005 | Hunt et al. | 701/32.4 |
| 7,035,923 B1 * | 4/2006 | Yoakum et al. | 709/224 |
| 7,079,024 B2 * | 7/2006 | Alarcon | 340/539.11 |
| 7,317,716 B1 * | 1/2008 | Boni et al. | 370/352 |
| 7,356,389 B2 * | 4/2008 | Holst et al. | 701/3 |
| 7,493,390 B2 * | 2/2009 | Bobde et al. | 709/224 |
| 2002/0085701 A1 * | 7/2002 | Parsons et al. | 379/211.01 |
| 2003/0154293 A1 * | 8/2003 | Zmolek | 709/228 |
| 2004/0122901 A1 * | 6/2004 | Sylvain | 709/206 |
| 2005/0264404 A1 * | 12/2005 | Franczyk et al. | 340/441 |

(Continued)

OTHER PUBLICATIONS

Nadeem et al, "TrafficView: Traffic Data Dissemination using Car-to-CarCommunication", Jan. 19, 2004, IEEE International Conference on Mobile Data Management, MDM'04, Mobile Computing and Communications Review, vol. 8, No. 3, p. 6-19, <Retrieved from ACM Portal Feb. 25, 2009>.*

(Continued)

*Primary Examiner* — Shew-Fen Lin

(57) ABSTRACT

A method may include receiving first event information about a first entity; receiving second event information about a second entity different from the first entity; associating the first entity and the second entity based on a user associated with the first entity and the second entity; and deriving presence event information based on the first event information and the second event information.

23 Claims, 11 Drawing Sheets

(56) References Cited

U.S. PATENT DOCUMENTS

| | | |
|---|---|---|
| 2005/0276407 A1* | 12/2005 | Mohler .................... 379/211.01 |
| 2006/0030264 A1* | 2/2006 | Morris ......................... 455/41.2 |
| 2006/0041844 A1* | 2/2006 | Homiller ....................... 715/734 |
| 2006/0052113 A1* | 3/2006 | Ophir et al. ................ 455/456.1 |
| 2006/0182251 A1* | 8/2006 | Seligmann et al. ...... 379/210.01 |
| 2007/0100981 A1* | 5/2007 | Adamczyk et al. ........... 709/223 |
| 2007/0198738 A1* | 8/2007 | Angiolillo et al. ............ 709/231 |
| 2008/0084868 A1* | 4/2008 | Brehm ......................... 370/352 |
| 2008/0120129 A1* | 5/2008 | Seubert et al. .................... 705/1 |
| 2009/0024601 A1* | 1/2009 | Zmolek ............................. 707/4 |

OTHER PUBLICATIONS

"Chapter VIII—Best Practices", A Final Report of the Review of Retail Service Quality Performance of Verizon New York, Inc. (Public), New York State Department of Public Service Oct. 29, 2004, www.dps.state.ny.us/ChapterVIIIPublic-BestPractices.pdf.

* cited by examiner

| VEHICLE ID 402 | SIP URI 404 |
|---|---|
| 110 | SIP:SMITH@ COLUMBIA.EDU |
| ⋮ | ⋮ |

ENTITY ASSOCIATION OR MAPPING TABLE 344

FIG. 4A

| FIRST SIP URI 412 | SECOND SIP URI 414 |
|---|---|
| SIP:JONES@ AOL.COM | SIP:JONES@ COLUMBIA.EDU |
| ⋮ | ⋮ |

ENTITY ASSOCIATION OR MAPPING TABLE 344

FIG. 4B

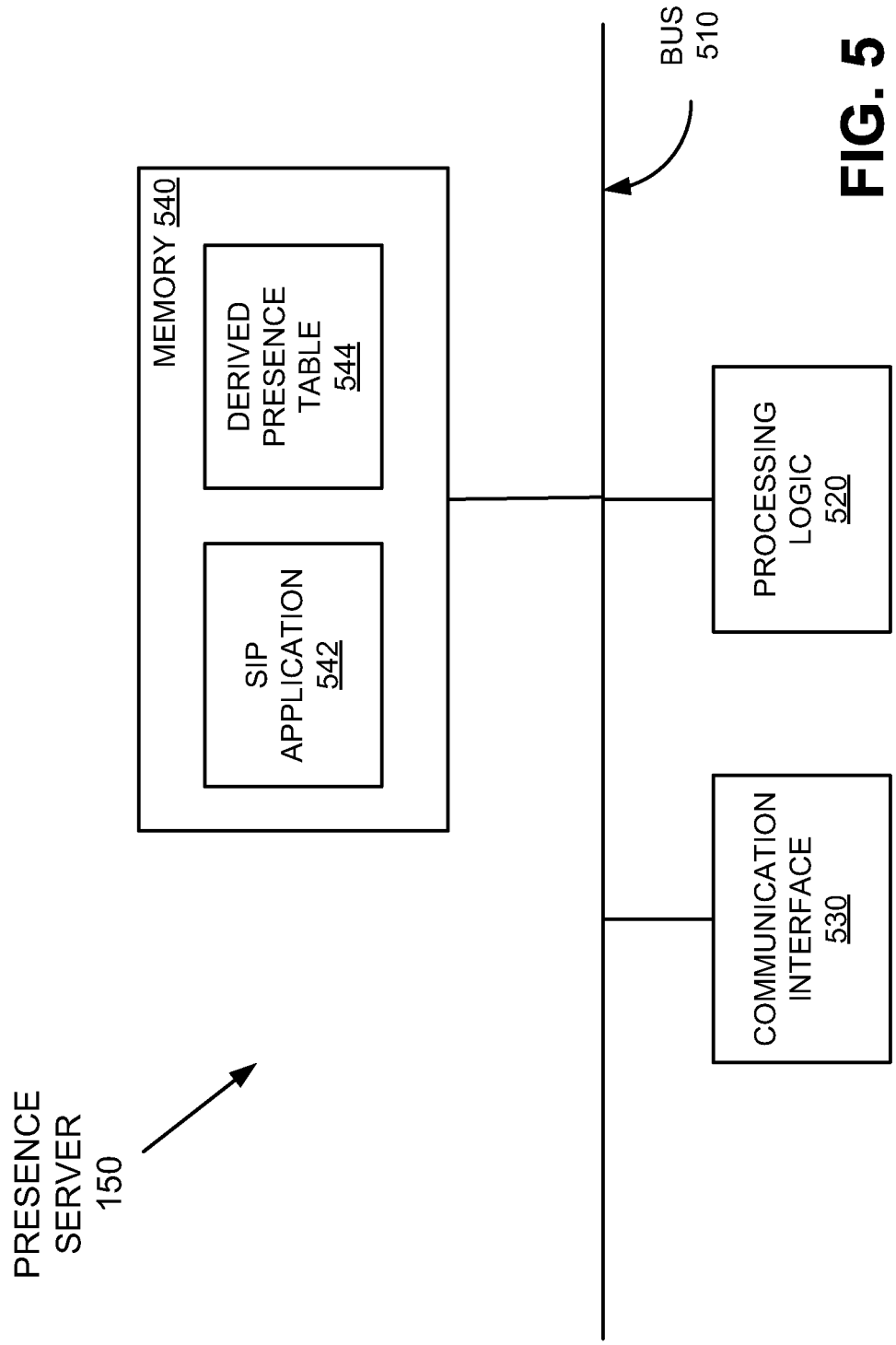

| | VEHICLE EVENT 602 | MOBILE DEVICE USER EVENT 604 | DERIVED PRESENCE 606 |
|---|---|---|---|
| 608 | STOPPED | * | STOPPED |
| 610 | MOVING | * | MOVING |
| 612 | IGNITION ON | * | -- |
| 614 | IGNITION OFF | * | STOPPED |
| 616 | MODEM LOST | * | UNKNOWN |
| 618 | MODEM GAINED | * | -- |
| 620 | GPS LOST | * | UNKNOWN |
| 622 | GPS GAINED | * | -- |
| 624 | * | AVAILABLE | AVAILABLE |
| 626 | * | BUSY | BUSY |

FIG. 6A  DERIVED PRESENCE TABLE 544

| VEHICLE EVENT 602 | MOBILE DEVICE USER EVENT 604 | DERIVED PRESENCE 606 |
|---|---|---|
| STOPPED | AVAILABLE | AVAILABLE |
| STOPPED | BUSY | BUSY |
| MOVING | AVAILABLE | BUSY |
| MOVING | BUSY | BUSY |

FIG. 6B

DERIVED PRESENCE TABLE
544

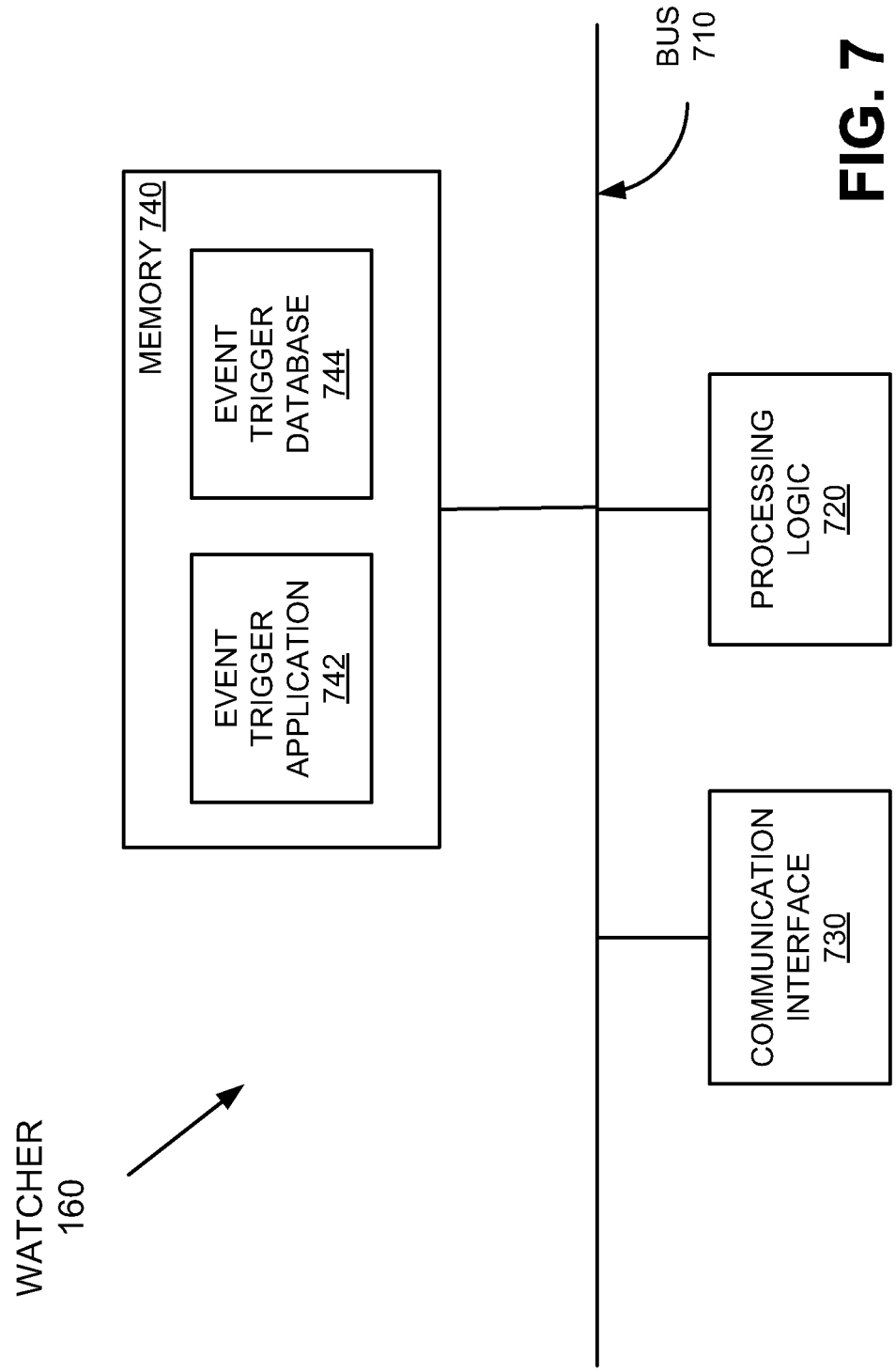

| FIRST EVENT CONDITION 702 | SECOND EVENT CONDITION 704 | THIRD EVENT CONDITION 705 | EVENT TRIGGER ACTION 706 |
|---|---|---|---|
| VEHICLE EVENT = STOP | MOBILE DEVICE USER EVENT = AVAIL | DERIVED PRESENCE = AVAIL | CALL BTW. MOBILE DEVICE 120 AND 192 |
| ... | ... | ... | ... |

710

EVENT TRIGGER DATABASE
744

DERIVED PRESENCE-AWARE SERVICE FROM ASSOCIATED ENTITIES

RELATED APPLICATIONS

This patent application claims the benefit of provisional U.S. Patent Application No. 60/807,127, filed on Jul. 12, 2006.

BACKGROUND INFORMATION

Instant messaging (IM) and presence form a part of modern network communications. Presence may allow a network's user's "buddy" or "watcher" to be aware of the user's mood (e.g., angry, happy, sad), availability (e.g., busy, available), or location. Presence services in a network may be provided using the Session Initiation Protocol (SIP).

BRIEF DESCRIPTION OF THE DRAWINGS

FIG. 4A is a block diagram of an exemplary entity association table of FIG. 3;

FIG. 4B is another block diagram of an exemplary entity association table of FIG. 3;

FIG. 5 is a block diagram of exemplary components of the presence server of FIG. 1;

FIG. 6A is a block diagram of an exemplary derived presence table of FIG. 5;

FIG. 6B is a block diagram of another exemplary derived presence table of FIG. 5;

FIG. 7 is a block diagram of exemplary components of the watcher of FIG. 1;

FIG. 8 is a block diagram of an exemplary event trigger database of FIG. 7;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1:
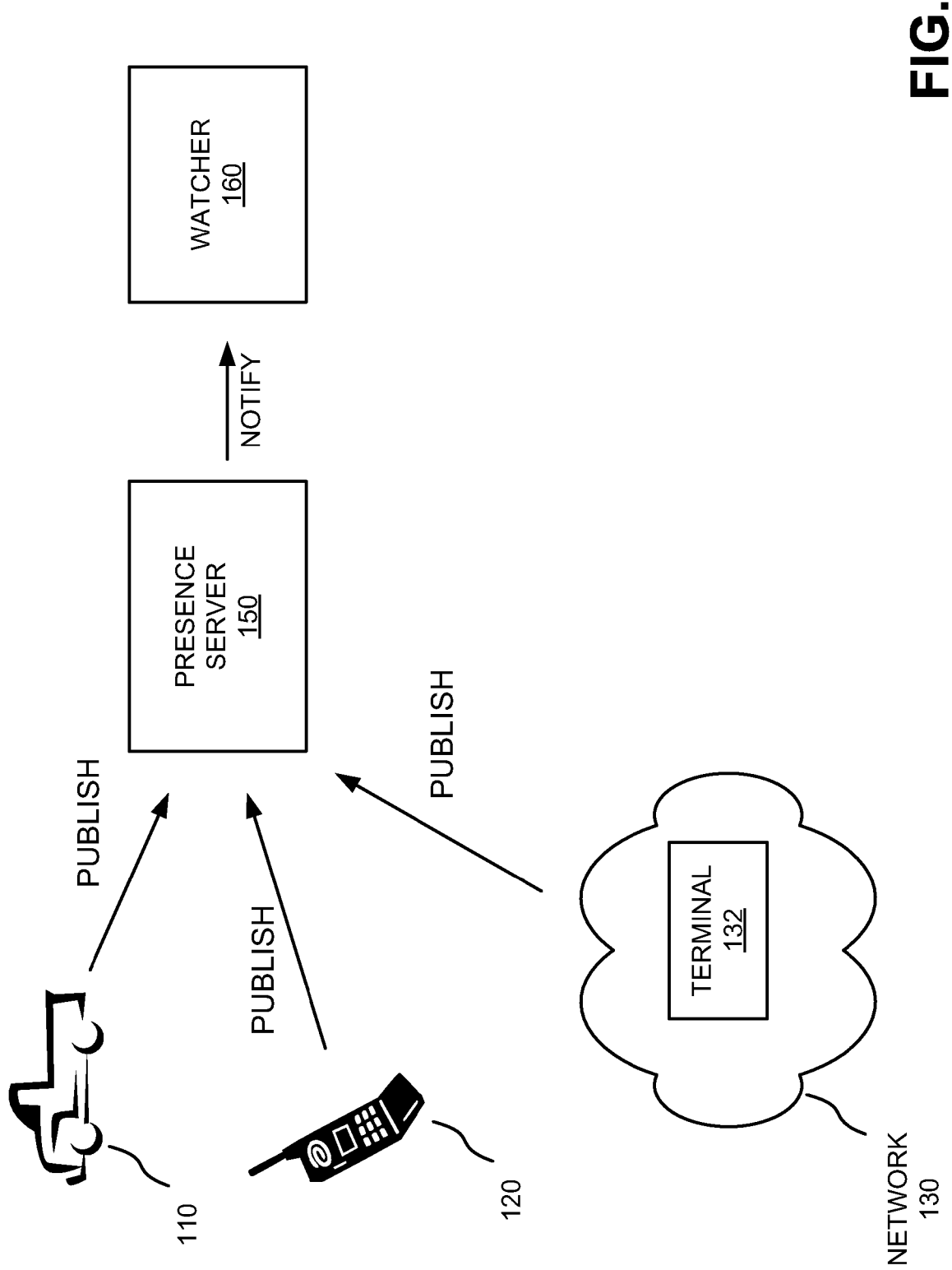
FIG. 1 is a block diagram of an exemplary presence-aware environment.

FIG. 1 is a block diagram of an exemplary presence-aware environment 100 ("exemplary environment 100"). Exemplary environment 100 may include a vehicle 110, a mobile device 120, a network 130 including a terminal 132, a presence server 150, and a watcher 160. In practice, there may be more or fewer devices or a different arrangement of devices than what is shown in FIG. 1. For example, environment 100 may include one or more mobile devices. Further, while FIG. 1 shows vehicle 110, mobile device 120, network 130, presence server 150, and watcher 160 in environment 100, one or more of these devices may be remotely located, e.g., the devices may be geographically diverse. Communication among vehicle 110, mobile device 120, network 130, presence server 150, and watcher 160 may be accomplished via wired, wireless, and optical communication connections.

Although FIG. 1 shows presence server 150 communicating directly with vehicle 110, mobile device 120, network 130, and watcher 160, communications may be indirect. Although presence server 150 may be referred to as a "servers," the term "server" as used herein means any type of computer.

Vehicle 110 may include an automobile, delivery truck, golf cart, bicycle, or any other device used for transportation. Vehicle 110 may be a part of a location tracking system including an Integrated In-Vehicle Device ("IIVD") that may implement components of a Service Assurance Business Intelligence Toolkit™ ("SABIT™") from Verizon. The vehicle location tracking system may provide "event information," such as vehicle status information and/or location information. For example, vehicle event information may include the following events: IGNITION ON, IGNITION OFF, LATITUDE, LONGITUDE, MOVING, and/or STOPPED, where LATITUDE and LONGITUDE may be indicative of the values of the vehicle's latitude and longitude. As used herein, "event information" may be synonymous with "presence information." Vehicle 110 may publish (using SIP's PUBLISH message, for example) its vehicle event information to presence server 150. Vehicle 110 may be considered an "entity" and the vehicle event information may describe status information related to this entity e.g., vehicle 110. As used herein, the word "entity" may be synonymous with "presentity"

Mobile device 120 may include one or more devices such as: a mobile telephone, a laptop computer, or a personal digital assistant (PDA), for example, that may be used by one user. Mobile device 120 may include an IM client that may publish user event information. Mobile device user event information may include the following events: AVAILABLE, BUSY, and ON PHONE. Mobile device 120 may publish its event information to presence server 150. The user of mobile device 120 may be considered an "entity" and mobile device user event information may describe status information related to this entity, e.g., the user of mobile device 120.

Network 130 may include a wide-area network (WAN), e.g., the Internet, a local-area network, a telephone network, e.g., the Public Switched Telephone Network (PSTN), an intranet, a private corporate network, or a combination of networks. Network 130 may provide services, such as applications and/or content. Network 130 may include terminal 132 for a user to access the services provided by network 130. Terminal 132 may include an IM client that may publish terminal user event information. Terminal user event information may include the following events: BUSY and/or AVAILABLE. Terminal 132 may publish its terminal user event information to presence server 150. The user of the IM client in terminal 132 may be considered an "entity" and the terminal user event information may describe status information related to this entity, e.g., the user of the IM client in terminal 132.

Presence server 150 may receive event information from vehicle 110, mobile device 120, and/or terminal 132. Presence server 150 may derive additional event information based on event information received from vehicle 110, mobile device 120, and/or terminal 132. The derived additional event information may be based on the association of entities, such as an association between vehicle 110, the user of the mobile device 120, and/or the user of the terminal 132. For example, vehicle 110 may be driven by the same person who uses mobile device 120. Further, vehicle 110 may be driven by the same person that uses the IM client on terminal 132. Presence server 150 may notify (using SIP's NOTIFY message, for example) watcher 160 of the derived presence information. In one embodiment, presence server 150 may notify watcher 160 only when there is a change in the derived presence information.

Watcher 160 may have subscribed (using SIP's SUBSCRIBE message, for example) to the derived presence information provided by presence server 150. Watcher 160 may include an application to monitor and/or track mobile device 120 and/or vehicle 110. Watcher 160 may create an "event trigger" or "rendezvous" service. An event trigger service may allow a task to be scheduled when a certain derived event state occurs. For example, the event trigger service may allow mobile device 120 to receive a message or a call when the user of device 120 becomes available and the user's vehicle is stopped.

As mentioned above, vehicle 110, the user of mobile device 120, and the user of terminal 132 may be considered "entities." Vehicle 110 may be considered in a vehicle fleet management domain, for example. Mobile device 120 and terminal 132 may be considered in a presence domain of users.

Figure 2:
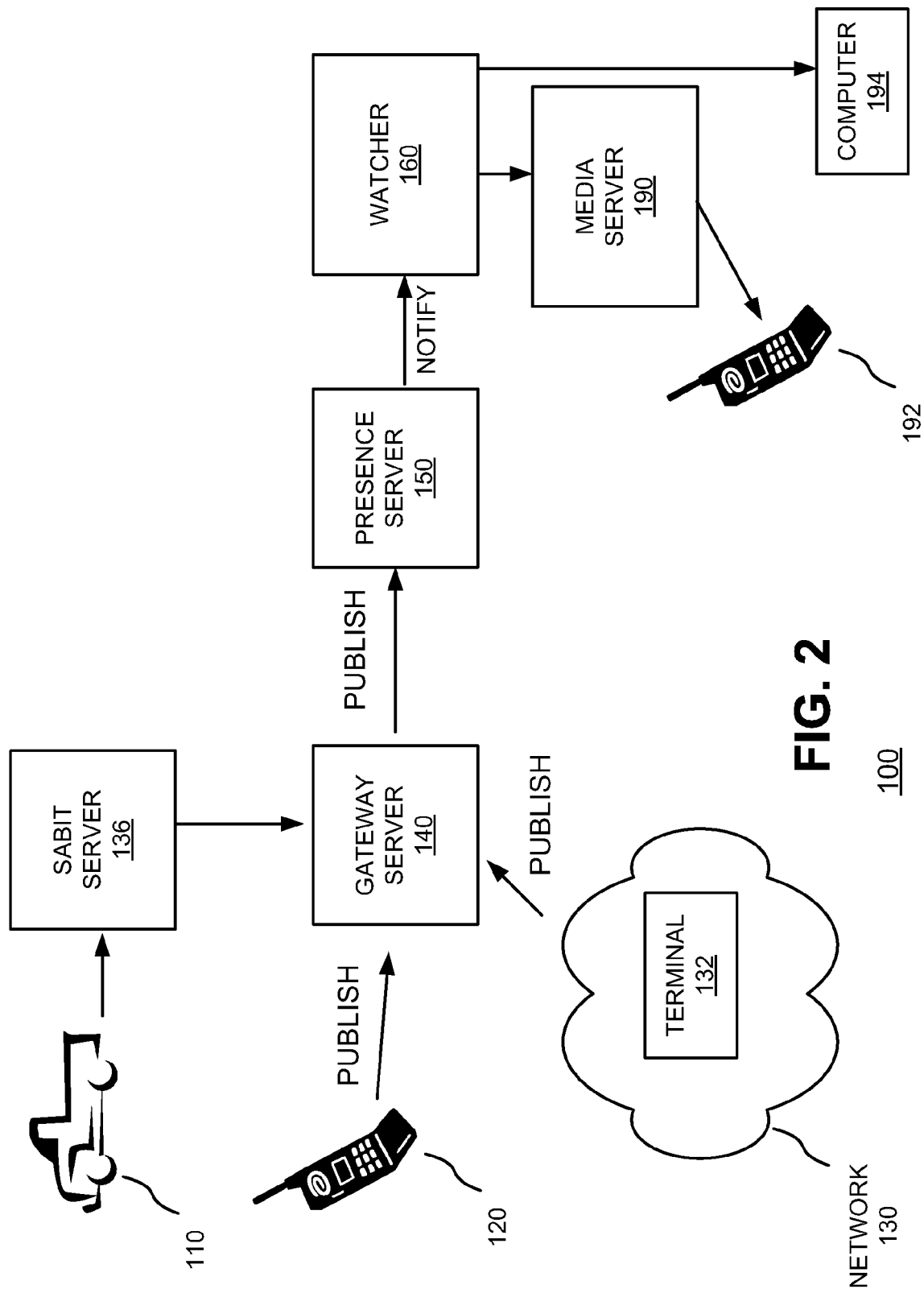
FIG. 2 is a more detailed block diagram of the exemplary environment of FIG. 1.

FIG. 2. is a more detailed block diagram of the exemplary environment 100 of FIG. 1. In addition to vehicle 110, mobile device 120, remote network 130, presence server 150, and watcher 160, environment 100 may include SABIT™ server 136, an HTTP/SIP gateway server 140 ("gateway server 140"), a media server 190, a mobile device 192, and a computer 194. In practice, there may be more or fewer devices or a different arrangement of devices than what is shown in FIG. 2. Further, while FIG. 1 shows devices in environment 100, one or more of these devices may be remotely located, e.g., the devices may be geographically diverse. Communication among devices in FIG. 2 may be accomplished via wired, wireless, and/or optical communication connections. Although FIG. 2 shows devices communicating directly with each other, communications may be indirect.

SABIT™ server 136 may be a system delivering location and vehicle status services. SABIT™ server 136 may be in communication with vehicle 110. As mentioned above, vehicle 110 may include an IIVD, which may convey vehicle event information to SABIT™ server 136. SABIT™ server 136 may receive the vehicle event information from the IIVD in vehicle 110 and may send the vehicle event information as HTTP messages to gateway 140.

Gateway server 140 may receive event information from SABIT™ server 136 in HTTP format and may publish the vehicle event information (using SIP's PUBLISH message, for example) to presence server 150 with a SIP uniform resource identifier ("URI"). Gateway server 140 may associate vehicle 110 with the user of mobile device 120 so that the vehicle event information published to presence server 150 may be properly identified as being associated with mobile device 120, for example.

Media server 190 may communicate with watcher 160. Mobile device 192 and computer 194 may be in communication with media server 190. Watcher 160 may interact with computer 194 to provide a web-based application to allow fetching of event information from watcher 160. Watcher 160 may interact with computer 194 to provide a web-based application to allow scheduling of tasks for an event trigger service.

Figure 3:
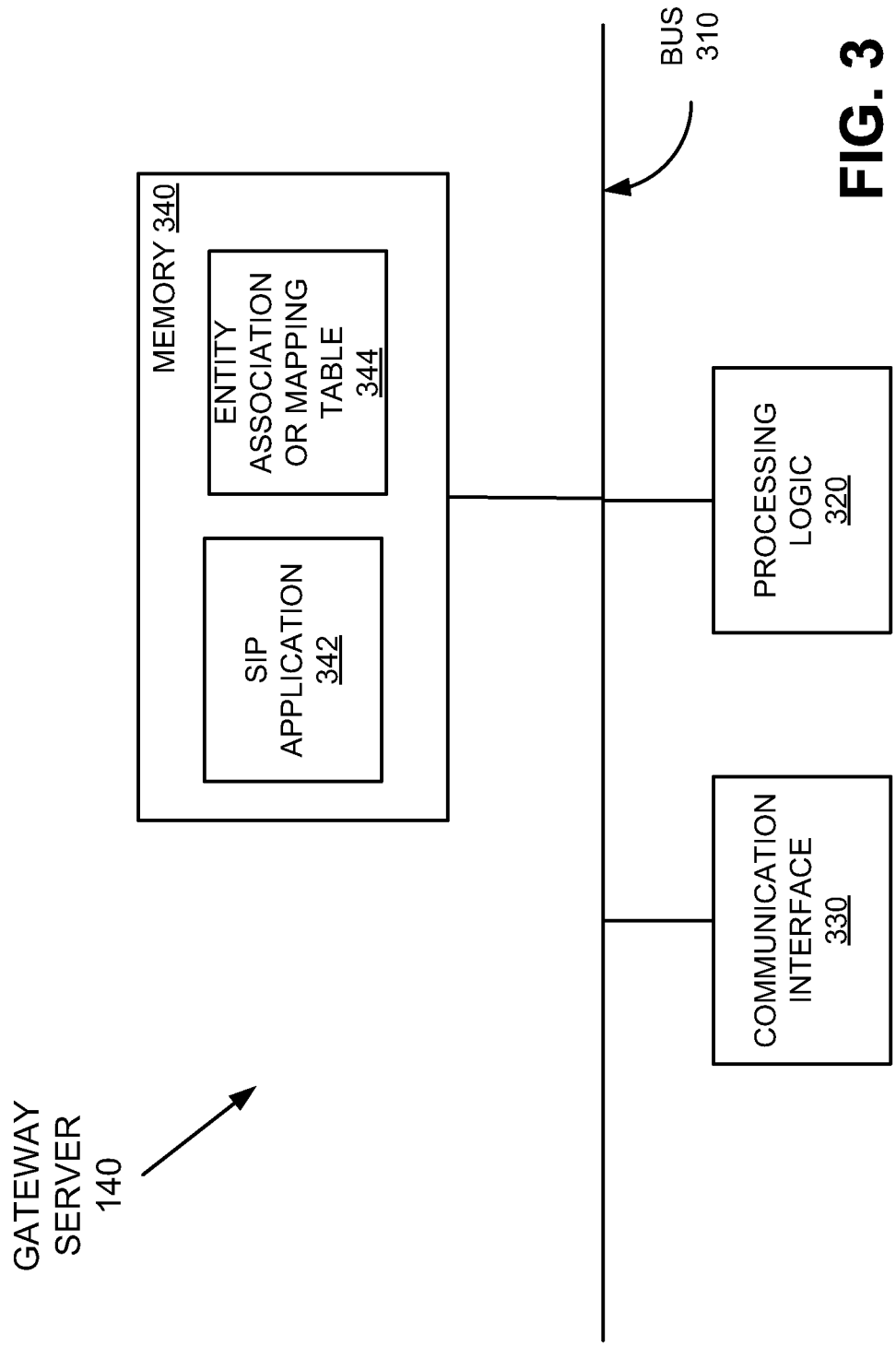
FIG. 3 is a block diagram of exemplary components of the gateway server of FIG. 1.

FIG. 3 is a block diagram of exemplary components of gateway server 140. Gateway server 140 may include a bus 310, processing logic 320, a communication interface 330, and a memory 340. Gateway server 140 may include other components (not shown) that aid in receiving, transmitting, and/or processing data. Moreover, other configurations of components in gateway server 140 are possible.

Bus 310 may include a path that permits communication among the components of gateway server 140. Processing logic 320 may include any type of processor or microprocessor that interprets and executes instructions. In other embodiments, processing logic 320 may include an application specific integrated circuit (ASIC), or field programmable gate array (FPGA).

Communication interface 330 may include any transceiver-like mechanism that enables gateway server 140 to communicate with other devices and/or systems. In one implementation, communication interface 330 may allow for gateway server 140 to be controlled and/or administered remotely by an operator or an administrator.

Memory 340 may include a random access memory (RAM) or another type of dynamic storage device that may store information and instructions for execution by processing logic 320; a read only memory (ROM) device or another type of static storage device that may store static information and instructions for use by processing logic 320; and/or some other type of magnetic or optical recording medium and its corresponding drive for storing information and/or instructions. Memory 340 may store SIP application 342. SIP application 342 may include instructions for causing gateway server 140 to implement the SIP protocol. Memory 340 may also store an entity association table 344. Entity association table 344 may associate entities, such as vehicle 110, the user of mobile device 120, and the user of terminal 132 to each other. Entity association table 344 is described in more detail below in FIGS. 4A and 4B.

Gateway server 140 may perform certain operations, as described in detail below. Gateway server 140 may perform these operations in response to processing logic 320 executing software instructions contained in a computer-readable medium, such as memory 340. A computer-readable medium may be defined as a physical or logical memory device and/or carrier wave. The software instructions may be read into memory 340 from another computer-readable medium or from another device via communication interface 330. The software instructions contained in memory 340 may cause processing logic 320 to perform processes that are described below.

FIG. 4A is a block diagram of exemplary entity association table 344. As illustrated, entity association table 344 may include a vehicle ID field 402 and a user's SIP URI field 404. Entity association table 344 may include additional or fewer fields than illustrated in FIG. 4A. For example, association table 344 may include more than two fields for two or more entities. Vehicle ID field 402 may include a unique identifier of a vehicle that may be tracked by SABIT™ system 136. SIP URI field 404 may include the SIP address of the operator of the vehicle using mobile device 120 identified in the corresponding vehicle ID field 402. For example, as illustrated in a record 406 of table 344, vehicle 110 may have a vehicle ID of "110." Mr. Smith, the operator of vehicle 110, may use mobile device 120. Mr. Smith, using mobile device 120, may have the SIP URI of "sip:smith@columbia.edu." Thus, "sip:smith@columbia.edu" may appear in the same record, e.g., record 406, identified with a vehicle ID of 110. An additional field (not shown) in entity association table 344 may include a field to identify an entity other than that of the user of mobile device 120 or vehicle 110. For example, an additional field may identify an entity using terminal 132.

FIG. 4B is a block diagram of another implementation of exemplary entity association table 344. As illustrated, entity association table 344 may include a first SIP URI field 412 and a second SIP URI field 414. Entity association table 344 may include more or fewer fields than shown in FIG. 4B. For example, entity association table 344 in FIG. 4B could show more than two entity SIP URI fields. Each field may identify a different entity. In one embodiment, each field may identify a different entity in a different domain. For example, first SIP URI field 412 may identify entities using personal mobile telephones. Second SIP URI field 414 may identify vehicles. A SIP URI field (not shown) may identify entities using business mobile telephones. Each record, e.g., row, in entity association table 344 may associate the personal mobile telephone and the vehicle of a single employee, for example.

FIG. 5 is a block diagram of exemplary components of presence server 150. As shown in FIG. 5, presence server 150 may include a bus 510, processing logic 520, a communication interface 530, and a memory 540. Presence server 150 may include other components (not shown) that aid in receiving, transmitting, and/or processing data. Moreover, other configurations of components that may form presence server 150 are possible.

Bus 510 may include a path that permits communication among the components of presence server 150. Processing logic 520 may include any type of processor or microprocessor that interprets and executes instructions. In other embodiments, processing logic 520 may include an ASIC, FPGA, or the like.

Communication interface 530 may include any transceiver-like mechanism that enables presence server 150 to communicate with other devices and/or systems. In one implementation, communication interface 530 may allow for presence server 150 to be controlled and/or administered remotely by an operator or an administrator.

Memory 540 may include a RAM or another type of dynamic storage device that may store information and instructions for execution by processing logic 520; a ROM device or another type of static storage device that may store static information and instructions for use by processing logic 520; and/or some other type of magnetic or optical recording medium and its corresponding drive for storing information and/or instructions. Memory 540 may store SIP application 542. SIP application 542 may include instructions for causing presence server 150 to implement the SIP protocol for specific event notification. Memory 540 may also store a derived presence table 544. Derived presence table 544 may allow for presence server 150 to derive additional presence information for the user entity based on the vehicle event information and the mobile device user event information. Presence server 150 may perform derived presence processing. Derived presence table 544 is described in more detail below in FIG. 6.

Presence server 150 may perform certain operations, as described in detail below. Presence server 150 may perform these operations in response to processing logic 520 executing software instructions contained in a computer-readable medium, such as memory 540. A computer-readable medium may be defined as a physical or logical memory device and/or carrier wave. The software instructions may be read into memory 540 from another computer-readable medium or from another device via communication interface 530. The software instructions contained in memory 540 may cause processing logic 520 to perform processes that are described below.

FIG. 6A is a block diagram of exemplary derived presence table 544. Derived presence table 544 may include a vehicle event field 602, a mobile device user event field 604, and a derived presence field 606. Derived presence table 544 may include additional or fewer fields than illustrated in FIG. 6A. Vehicle event field 602 may include events associated with vehicle 110, for example. Mobile device user event field 604 may include events associated with the user of mobile device 120, for example. Derived presence field 606 may include the events that may be derived from the vehicle event field 602 and mobile device user event field 604. Vehicle event field 602 and mobile device user event field 604 may be considered input fields, and derived presence field 606 may be considered an output field.

Exemplary derived presence table 544 in FIG. 6A includes ten records, record 608 through record 626. Vehicle event field 602 may include values selected from STOP, MOVING, IGNITION ON, IGNITION OFF, MODEM LOST, MODEM GAINED, GPS LOST, and GPS GAINED. Mobile device user event field 604 may include values selected from AVAILABLE and BUSY. In both vehicle event field 602 and mobile device user event field 604, the asterisk ("*") may indicate that the derived presence field 606 may not be dependent on the state of the corresponding field with the asterisk. In other words, the asterisk may symbolize a "wild card." As shown in FIG. 6A, record 608, a vehicle event of STOP results in a derived presence of STOPPED no matter the state of mobile device user event field 604. As shown in record 610, a vehicle event of MOVING results in a derived presence of MOVING no matter the state of mobile device user event field.

FIG. 6B is a block diagram of another implementation of exemplary derived presence table 544. Derived presence table 544 in FIG. 6B, like in FIG. 6A, may include vehicle event field 602, mobile device user event field 604, and derived presence event field 606. In exemplary derived presence table 544 of FIG. 6B, derived presence field 606 may be dependant on both vehicle event field 602 and mobile device user event field 604. For example, in record 652, a vehicle event of STOP and a mobile device user event of AVAILABLE may result in a derived presence of AVAILABLE. In record 654, a vehicle event of STOP and a mobile device user event of BUSY may result in a derived presence of BUSY.

FIG. 7 is a block diagram of exemplary components of watcher 160. As shown in FIG. 7, watcher 160 may include a bus 710, processing logic 720, a communication interface 730, and a memory 740. Watcher 160 may include other components (not shown) that aid in receiving, transmitting, and/or processing data. Moreover, other configurations of components in watcher 160 are possible.

Bus 710 may include a path that permits communication among the components of watcher 160. Processing logic 720 may include any type of processor or microprocessor that interprets and executes instructions. In other embodiments, processing logic 720 may include an ASIC, FPGA, or the like.

Communication interface 730 may include any transceiver-like mechanism that enables watcher 160 to communicate with other devices and/or systems. In one implementation, communication interface 730 may allow for watcher 160 to be controlled and/or administered remotely by an operator or an administrator.

Memory 740 may include a RAM or another type of dynamic storage device that may store information and instructions for execution by processing logic 720; a ROM device or another type of static storage device that may store static information and instructions for use by processing logic 720; and/or some other type of magnetic or optical recording medium and its corresponding drive for storing information and/or instructions. Memory 740 may store event trigger application 742, described in FIG. 10. Memory 740 may also store an event trigger database 744, described in FIG. 8.

Watcher 160 may perform certain operations, as described in detail below. Watcher 160 may perform these operations in response to processing logic 720 executing software instructions contained in a computer-readable medium, such as memory 740. A computer-readable medium may be defined as a physical or logical memory device and/or carrier wave. The software instructions may be read into memory 740 from another computer-readable medium or from another device via communication interface 730. The software instructions contained in memory 740 may cause processing logic 720 to perform processes that are described below.

FIG. 8 is a block diagram of exemplary event trigger database 744. As illustrated, event trigger database 744 may include a first condition field 702, a second condition field 704, a third event field 705, and an event trigger event action field 706. Event trigger database 744 may include more or fewer fields than shown in FIG. 8. For example, event trigger database 744 may include more than three conditions—or one or two conditions. In the exemplary embodiment of FIG. 8, event trigger database 744 includes record 710. Record 710 may indicate that when vehicle event is STOP (for vehicle 110), mobile device user event is AVAILABLE (for mobile device 120), and derived presence is AVAILABLE, then a call should be established between mobile device 120 and a supervisor, who may use mobile device 192, for example.

Figure 9:
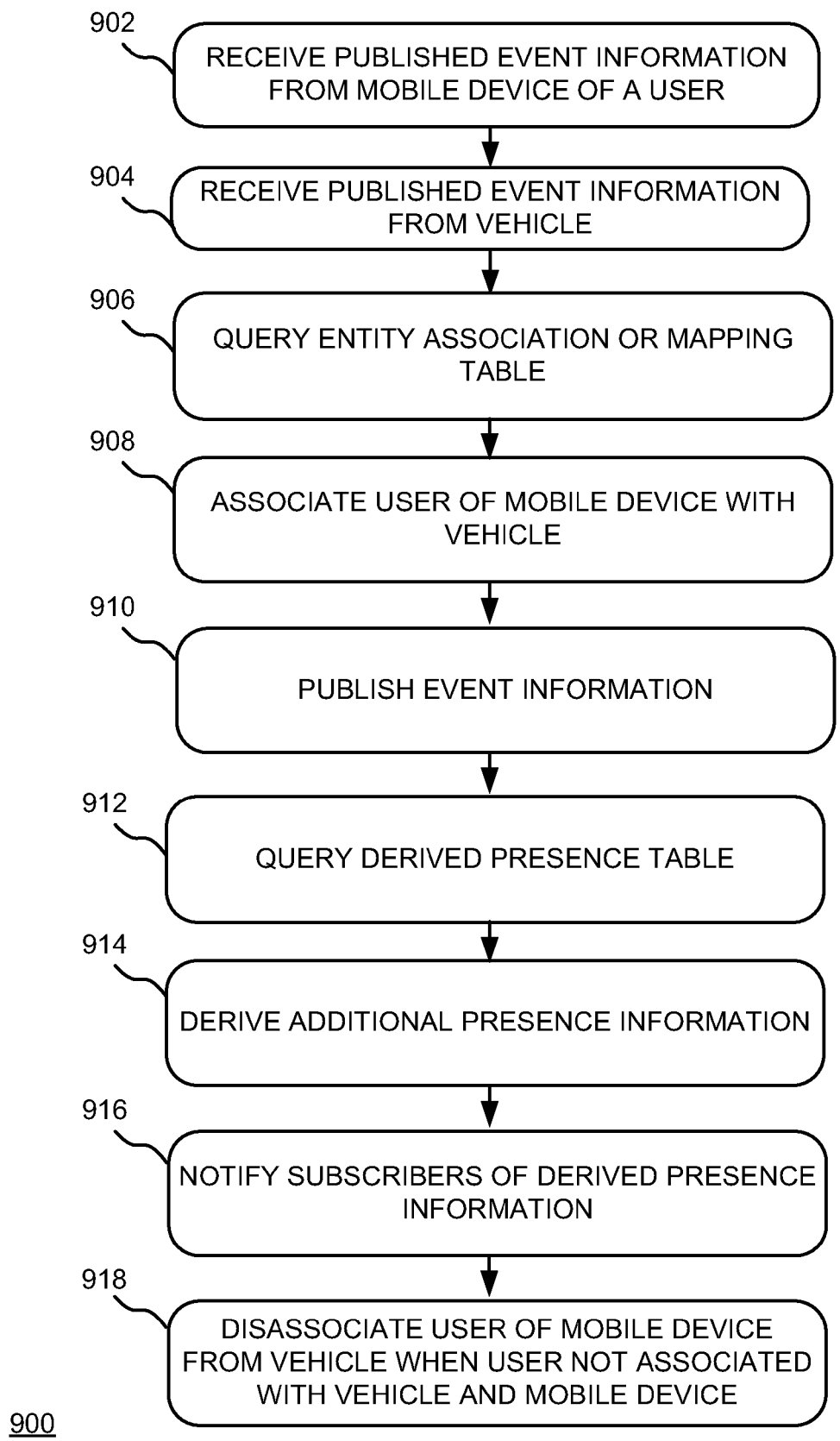
FIG. 9 is a flow chart of an exemplary process for deriving presence information.

FIG. 9 is a flow chart of an exemplary process 900 for presence-aware system for associating entities. Published vehicle event information may be received from vehicle 110 (block 902). Published mobile device user event information may be received from mobile device 120 (block 904). For example, presence server 150 and/or gateway 140 may receive event information (directly or indirectly) from mobile device 120 and/or vehicle 110. In one exemplary embodiment, presence server 150 and or gateway server 140 may receive event information from more than two entities. Entity association table 344 may be queried (block 906) and may associate mobile device 120 with vehicle 110 (block 908). In exemplary environment 100, presence server 150 and gateway 140 may query entity association table 344 and may associate the user of mobile device 120 with vehicle 110. In entity association table 344, record 406 may allow gateway 140 to associate vehicle 110 with a SIP URI of "sip:smith@columbia.edu," e.g., the user of the mobile device 120. The event information from associated mobile device 120 and vehicle 110 may be published (block 910). In exemplary embodiment 100, gateway 140 may publish the event information from vehicle 110, now associated with the user of the mobile device 120. Derived presence table 544 may be queried (block 912) and additional event information may be derived (block 912). In exemplary environment 100, presence server 150 may query derived presence table 544 and may derive additional event information. Subscribers may be notified of the derived presence information (block 914). In exemplary environment 100, watcher 160 may subscribe to the derived presence information and presence server 150 may notify watcher 160 of the derived presence information. In exemplary environment 100, record 406 may be removed from association table 344 when vehicle 110 and the user of the mobile device 120 are no longer associated with each other, for example, when the user of mobile device 120 may not be assigned to be the driver of vehicle 110. Thus, in one embodiment, the user of mobile device 120 and vehicle 110 may be disassociated when the user is no longer associated with mobile device 120 and vehicle 110 (block 918).

Figure 10:
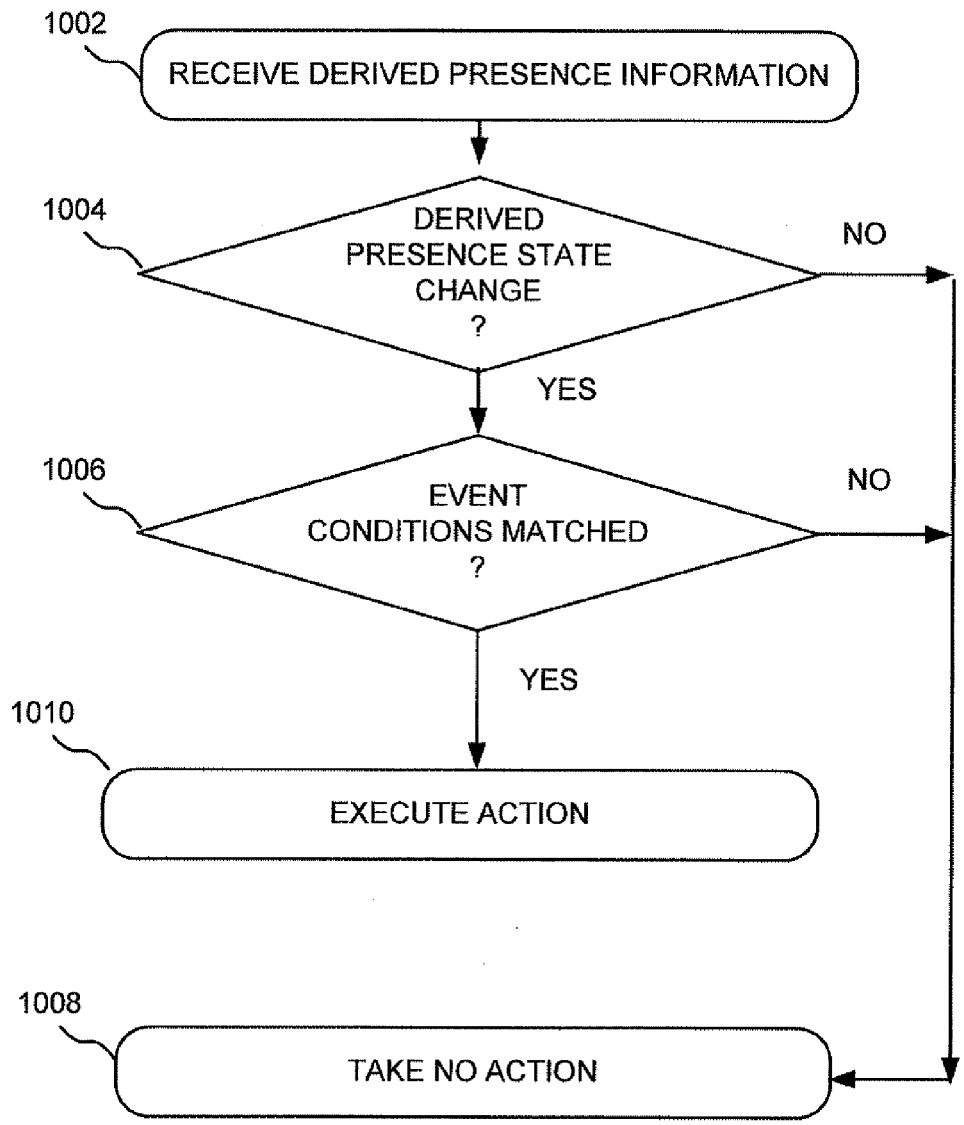
FIG. 10 is a flow chart of an exemplary process for an event trigger application.

FIG. 10 is a flow chart of an exemplary process 1000 for an event trigger application. The derived presence information may be received (block 1002). In exemplary embodiment 100, watcher 160 may receive the derived presence information from presence server 150. In one embodiment, watcher 160 may receive entity event information, such as vehicle event information or mobile device user event information. If the derived presence state has not changed (block 1004), then no action may be taken (block 1008). In one exemplary embodiment, watcher 160 only receives derived presence information when the derived presence information changes. If the derived presence event state has changed (block 1004), then the derived presence information may be compared to conditions in event trigger database 744 (block 1006). Depending on the result of the comparison of the derived presence event information to the event trigger database (block 1006), either no action may be taken (block 1008) or an action, such as a communication action, e.g., telephone call may be executed or scheduled to be executed (block 1010).

The following illustrates an exemplary use of exemplary process 1000. Jim is a technician and his vehicle, e.g., vehicle 110, is parked at 509W, 122nd Street, New York, N.Y. His cell phone, e.g., mobile device 120, is on and Jim indicates that he is AVAILABLE using his phone. In addition, presence server 150 may indicate that Jim's derived presence information is AVAILABLE. Jim's supervisor, using the browser in computer 194, sees that Jim's derived presence information is AVAILABLE. The supervisor may know that it is safe to call Jim because Jim's derived presence information is AVAILABLE. If vehicle 110 is moving, however, the supervisor can use the browser in computer 194 to interact with event trigger application 742 to schedule an action. For example, event trigger application 742 may create record 710 in event trigger database 744. Record 710 indicates the conditions where Jim's vehicle, e.g., vehicle 110, is STOPPED and Jim's mobile phone, e.g., mobile device 120, indicates Jim is AVAILABLE, and Jim's derived presence is AVAILABLE. When Jim's vehicle stops, Jim indicates that he is AVAILABLE, and his derived presence is AVAILABLE, media server 190, using event trigger application 742, may establish a call between Jim's mobile phone, e.g., mobile device 120, and the supervisor's phone, such as mobile device 192 or any other telephone device. In another embodiment, event trigger application 742 may execute an action based solely on Jim's derived presence information, for example.

CONCLUSION

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Implementations described herein may allow for the derivation of presence or event information for one entity from another entity or entities, where entities may belong to different domains. Methods and systems described herein may allow for a user's presence information to be derived from a GPS-enabled vehicle and user's mobile phone or PDA, for example. Other types of entities/devices from which user presence information may be derived may include wired and wireless phones, calendar applications, meeting maker applications, and location sensors.

Implementations described herein may allow for a presence-based vehicle or service crew management. Implementations described herein may enable dispatching or redirecting service crews based on service crews' location and availability. Implementations described herein may include a vehicle as an entity in a presence system. Implementations described herein may allow for deriving a user's location from a vehicle's location. In one embodiment, entity association table 344 may be stored in presence server 150 in addition to or instead of in gateway 140.

In one implementation, mobile device 120 may indicate AVAILABLE whenever mobile device 120 is turned on and has a strong communication signal. In one embodiment mobile device 192 may be replaced by a land-line telephone, for example.

In one implementation, mobile device 120, or the communication infrastructure it uses, may publish mobile device user event information related to its location. Mobile device 120 and/or the infrastructure may use different location technologies such as triangulation techniques or GPS to send mobile device user location event information to gateway 140 in HTTP format, for example. Gateway 140 may then receive the mobile device user location event information and associate it with vehicle 110, for example.

In another embodiment, all the different entities may each have a URI, such as a SIP URI. In this embodiment, presence server 150 may store entity table 344 and may associate entities with each other. In one embodiment, an association of entities may be assigned its own URI, such as a SIP URI.

For example, although gateway server 140, presence server 150, and watcher 160 may be controlled and/or administered remotely, each may also include an input device (not shown) that permits an operator/administrator to input information, control or administer each server. Such an input device may include a keyboard, a keypad, a mouse, a pen, a microphone, or one or more biometric mechanisms. Further, each may also include an output device (not shown) that outputs information to the operator or administrator. Such an output device may include a display, a printer, a speaker, etc.

While series of acts have been described above with respect to FIGS. 9 and 10, the order of the acts may differ in other implementations consistent with principles of the invention. Moreover, non-dependent acts may be performed in parallel.

It will be apparent that aspects of the embodiments, as described above, may be implemented in many different forms of software, firmware, and hardware in the implementations illustrated in the figures. The actual software code or specialized control hardware used to implement these embodiments consistent with the principles of the invention is not limiting of the invention. Thus, the operation and behavior of the preferred embodiments of the invention were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item intended, the term "one" or similar language is used. Further, the phrase "based on" is intended to mean "based, at least in part, on" unless explicitly stated otherwise.

What is claimed is:

1. A method comprising:
receiving, at a computing device, first event information about a vehicle, wherein the first event information indicates a speed of the vehicle;
receiving, at the computing device, second event information about a mobile communication device that is free to move independently from the vehicle, wherein the second event information indicates whether the mobile communication device is busy or available;
receiving, at the computing device and based on information in an entity association table, an indication that the vehicle and the mobile communication device are associated with a user of the vehicle and the mobile communication device;
deriving, at the computing device, presence event information based on the received first event information and the received second event information, wherein the derived presence event information indicates whether a user of the mobile communication device is available or not available for a telephonic call based on the first event information, including the indication of the speed of the vehicle, and the second event information, and wherein the derived presence event information indicates that the user of the mobile communication device is available when the vehicle is stopped and when the mobile communication device is available;
receiving, via a browser or an application associated with the computing device and from a user of another communication device, an instruction for the mobile communication device to initiate a telephonic call to the other communication device when the user of the mobile device is available for the telephonic call;
storing the instruction in an event trigger database; and
automatically initiating the telephonic call between the mobile communication device and the other communication device in response to the instruction and based on comparing the derived presence event information to conditions in the event trigger database, wherein the conditions include the derived presence information changing from indicating that the user of the mobile communication device is not available for the telephonic call to indicating that the user of the mobile communication device is available for the telephonic call.

2. The method of claim 1, wherein the first event information indicates whether an ignition of the vehicle is on or off, wherein the derived presence event information indicates whether the user of the mobile communication device is available for a telephonic call based on the indication of whether the ignition is on or off.

3. The method of claim 1, further comprising accessing a database that stores a plurality of records, each record identifying an association between one entity and at least one other entity.

4. The method of claim 1, where deriving presence event information comprises accessing a database that stores a plurality of records, where one of the records associates a first stored event information of the vehicle and a second stored event information of the mobile communication device with a stored derived presence event information, the method further comprising setting the derived presence event information to the stored derived presence event information when the first event information matches the first stored event information and the second event information matches the second stored event information.

5. The method of claim 1, further comprising disassociating the vehicle and the mobile communication device when the user is no longer associated with the vehicle and the mobile communication device.

6. The method of claim 1, wherein receiving the first event information from the vehicle or receiving the second event information from the mobile communication device comprises receiving the first event information or the second event information through a wireless network.

7. The method of claim 1, where the computing device is a presence server communicatively coupled to the vehicle and the mobile communication device through a wireless network.

8. The method of claim 1, where receiving the second event information comprises receiving the second event information from a server that is communicatively coupled to a location tracking device within the vehicle.

9. The method of claim 1, further comprising:
comparing, at the computing device, the derived presence event information to conditions in the event trigger database; and
scheduling, at the computing device, an action based on the comparison of the derived presence event information to the conditions in the event trigger database, wherein the action includes the automatic initiation of the telephonic call.

10. The method of claim 1, wherein the first event information indicates whether an ignition of the vehicle is on or off, wherein the derived presence event information indicates that the user of the mobile communication device is available for a telephonic call when the first event information indicates that the ignition is off.

11. The method of claim 1,
wherein the computing device is a presence server communicatively coupled to the mobile communication device through a wireless network; and
wherein receiving the second event information comprises receiving the second event information from a server that is communicatively coupled to a location tracking device within the vehicle, wherein the location tracking device within the vehicle is different than the mobile communication device.

12. An apparatus comprising:
a receiver to:
receive first event information about a mobile communication device, wherein the first event information indicates whether the mobile communication device is available or busy; and
receive second event information about a vehicle associated with the user, wherein the second event information indicates a speed of the vehicle, wherein the mobile communication device is free to move independently of the vehicle;
a processor to:
associate, using an entity association table, the mobile communication device and the vehicle based on the user associated with the mobile communication device and the vehicle;
derive presence event information based on the first event information and the second event information, wherein the derived presence event information indicates whether a user of the mobile communication device is available or is not available for a telephonic call based on the first event information and the second event information including the indication of the speed of the vehicle, and wherein the derived presence event information indicates that the user of the mobile communication device is available when the vehicle is stopped and when the mobile communication device is available;
receive, via a web browser or an application, an instruction from a user of another communication device for the mobile communication device to initiate a telephonic call with the other communication device when the user of the mobile communication device is available for a telephonic call;
store the instruction in an event trigger database;
compare the derived presence event information to conditions in the event trigger database, wherein the conditions include the derived presence information changing from indicating that the user of the mobile communication device is not available for a telephonic call to indicating that the user of the mobile communication device is available for a telephonic call; and
automatically initiate the telephonic call between the mobile communication device and the other communication device based on the stored instruction, the comparison of the derived presence event information to the conditions in the event trigger database, and the derived presence information changing from indicating that the user of the mobile communication device is not available for a telephonic call to indicating that the user of the mobile communication device is available for a telephonic call.

13. The apparatus of claim 12, where the second event information comprises vehicle event information regarding a location of the vehicle.

14. The apparatus of claim 12, where the second event information indicates whether an ignition of the vehicle is on or off.

15. The apparatus of claim 12, where the processor associates the first event information and the second event information by accessing a database that associates the user of the mobile communication device with the vehicle.

16. The apparatus of claim 12, where the processor derives presence event information by accessing a database that stores a plurality of records, where one of the records associates a first stored event information of the mobile communication device and a second stored event information of the vehicle with a stored presence event information, wherein the processor selects the stored derived presence event information when the first event information matches the first stored event information and the second event information matches the second stored event information.

17. An apparatus of claim 12, wherein the processor disassociates the user from the mobile communication device and the vehicle when the user is no longer associated with the mobile communication device and the vehicle.

18. An apparatus comprising:
a receiver to:
receive first event information about a vehicle, wherein the first event information includes an indication of whether an ignition of the vehicle is on or off;
receive second event information about a mobile communication device that is free to move independently from the vehicle, wherein the second event information indicates whether the mobile communication device is busy or available;
a processor to:
associate, using an entity association table, the vehicle and the mobile communication device based on a user associated with the vehicle and the mobile communication device;
derive presence event information based on the first event information and the second event information, wherein the derived presence event information indicates whether a user of the mobile communication device is available or is not available for a telephonic call based on the first event information and the second event information including the indication of whether the ignition of the vehicle is on or off, and wherein the derived presence information indicates that the user of the mobile communication device is available for the telephonic call when the ignition of the vehicle is off and when the mobile communication device is available;

receive, via a web browser or an application, an instruction from a user of another communication device for the mobile communication device to initiate a telephonic call with the other communication device when the user associated with the mobile communication device is available for a telephonic call;

store the instruction in an event trigger database;

compare the derived presence event information to conditions in the event trigger database, wherein the conditions include the derived presence information changing from indicating that the user is not available to indicating that the user is available for a telephonic call; and schedule an action based on the comparison of the derived presence event information to the conditions in the event trigger database, wherein the scheduled action includes automatically initiating the telephonic call.

19. The apparatus of claim 18, where the first event information indicates whether the vehicle is in motion, wherein the derived presence event information indicates that the user of the mobile communication device is not available for the telephonic call when the first event information indicates that the vehicle is in motion.

20. The apparatus of claim 18, where the first event information comprises a location of the vehicle.

21. The apparatus of claim 18, where the processor is further to access a database associating the vehicle with the mobile communication device when associating the first event information and the second event information.

22. The apparatus of claim 18, where the processor is to access a database that stores a plurality of records, where one of the records associates a first stored event information of the vehicle and a second stored event information of the mobile communication device with a stored presence event information, wherein the processor selects the stored derived presence event information as the derived presence event information when the first stored event information matches the first event information and the second stored event information matches the second event information.

23. The apparatus of claim 18, wherein the scheduled action includes automatically initiating the telephonic call between the mobile communication device and another communication device based on the comparison of the derived presence event information to the conditions in the event trigger database.

* * * * *